(12) United States Patent
Damien

(10) Patent No.: US 6,580,690 B1
(45) Date of Patent: Jun. 17, 2003

(54) SECURITY BY DOUBLING AT LEAST CERTAIN LOGIC PATHS IN A TELECOMMUNICATIONS NETWORK

(75) Inventor: Souad Damien, Palaiseau (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 949 days.

(21) Appl. No.: 08/684,871

(22) Filed: Jul. 25, 1996

(30) Foreign Application Priority Data

Jul. 26, 1995 (FR) .............................. 95 09084

(51) Int. Cl.$^7$ .............................................. H04L 12/26
(52) U.S. Cl. ....................................................... 370/228
(58) Field of Search ................................ 370/216, 225, 370/226, 227, 228, 241, 242, 248, 250, 251, 351, 389, 390, 392, 395, 396, 397, 400; 371/20.1, 20.4, 20.5, 47.1, 67.1, 68.1, 68.2, 69.1; 395/200.01, 200.02

(56) References Cited

U.S. PATENT DOCUMENTS

| | | | | |
|---|---|---|---|---|
| 5,268,897 A | * | 12/1993 | Komine et al. | 370/400 |
| 5,315,581 A | | 5/1994 | Nakano et al. | 370/218 |
| 5,394,398 A | * | 2/1995 | Rau | 370/394 |
| 5,457,678 A | * | 10/1995 | Goeldner | 370/395 |
| 5,559,959 A | * | 9/1996 | Foglar | 395/183.19 |
| 5,600,638 A | * | 2/1997 | Bertin et al. | 370/351 |
| 5,627,822 A | * | 5/1997 | Edmaier et al. | 370/218 |

FOREIGN PATENT DOCUMENTS

| | | |
|---|---|---|
| CA | 2132063 | 3/1995 |
| DE | 4331577 A1 | 3/1995 |
| EP | 0535396a1 | 4/1993 |

OTHER PUBLICATIONS

"Brehat: First High–Bit Rate Network Based on ATM Technology" by J. Legras, G. Onno and M. Lemonier, Published in "Communication & Transmission", No. 3, 1991.

* cited by examiner

Primary Examiner—Kwang Bin Yao
(74) Attorney, Agent, or Firm—Laurie E. Gathman

(57) ABSTRACT

The invention relates to the security of a telecommunications network by duplication of virtual paths between switching nodes. In the case of a malfunctioning on the main path, the input switching node switches its output to the substitute path. For ensuring an effective security, each of said paths utilizes a different route in the network which leads to different transit times and thus to a shift in the reception of the data coming from the two paths. According to the invention and in order to avoid any loss or duplication of packets when they are switched from one path to another, the shift between these paths is evaluated and before the data packets are switched, this shift is taken into account.

20 Claims, 3 Drawing Sheets

SECURITY BY DOUBLING AT LEAST CERTAIN LOGIC PATHS IN A TELECOMMUNICATIONS NETWORK

FIELD OF THE INVENTION

The invention relates to a packet switching telecommunications network comprising a plurality of switching nodes between which packets are intended to be transported by logic paths, said network comprising, for securing a logic path called main path between a first and a second switching node, means for linking at least another logic path called substitute path to said main path which substitute path is intended to transport the same packets, the second node comprising switching means for switching from a main path to a substitute path.

The invention also relates to a switching node intended to be used in such a telecommunications network.

The invention has advantageous applications in the field of telecommunications network security, more particularly, for networks of the ATM type.

BACKGROUND OF THE INVENTION

Networks of the ATM type use the idea of virtual paths which makes it possible to handle a total of up to $2^{16}$ virtual circuits. More particularly, it is thus possible to secure the network by duplicating certain of these paths. Such a solution is described in Canadian Patent Application no. 2,132,063 filed by Siemens on Sep. 14, 1994.

This Patent Application describes indeed the use of pairs of paths formed by a main path and a substitute path which use different routes in the network between a first and a second switching node of the ATM network. The cells arriving at said first switching node are duplicated to be transmitted to said second switching node by the main path and by the substitute path. In normal operation, only the cells arriving by the main path are transmitted by the second switching node, whereas the cells arriving by the substitute path are suppressed. On the other hand, in the case of malfunctioning of the main path, it is the cells arriving by the substitute path which are transmitted by the second switching node, whereas the cells arriving by the main path are suppressed.

However, for this security to be effective it is necessary that the main path and the substitute path use different routes as much as possible. This implies different network transit times on either one of these paths. By way of example, for a high-rate network that utilizes transmission means based on optical fibers, a 100 km route difference between two paths causes a shift of the order of 1 ms. For cells of 53 octets (size of the ATM cell) and for virtual paths having a rate of several Mbit/s, such a shift is likely to cause the loss or the duplication of about ten cells when a switch is made from a main path to a substitute path.

Such a loss or duplication of cells leads to the disturbance of most of the services carried by the respective virtual path, more especially as the cells coming from the various services are generally interleaved to a maximum level in order to ensure a uniform rate for the various services. The upper layers of the disturbed services when an irregularity is established will make requests for return transmissions, which will have a highly undesirable "snowball" effect especially in the case where the cause of the switching from the main path to the substitute path was just a congestion of the main path.

SUMMARY OF THE INVENTION

It is an object of the invention to propose a system which remedies this disadvantage.

Therefore, a system according to the invention and as described in the opening paragraph is characterized in that the second node comprises calculation means for calculating a shift between the packets received on said paths, and check means for checking the switching to avoid packet losses or packet duplications by taking said shift into account.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

The embodiment which will now be described applies to an ATM switching network with security of at least certain virtual paths and with a monitoring of the quality of the virtual paths in conformity with Recommendation 1610 of CCITT.

However, the invention may be applied to other security levels (security, for example, at the level of a virtual circuit), to another type of connection (more particularly to connections whose quality is not monitored) and to any type of packet switching network in which the order of delivery of the packets is not modified.

Figure 1:
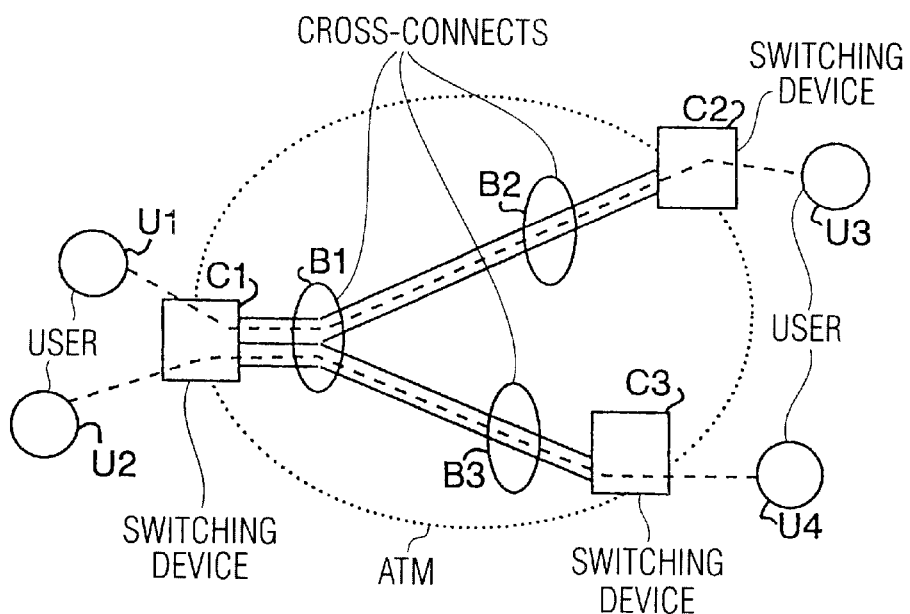
FIG. 1 represents in a diagram a network according to the invention.

FIG. 1 represents in a diagram an ATM network according to the invention. Such a network comprises cross-connects B1, B2 and B3 which perform a switching function at the level of the virtual paths VP and switching devices C1, C2 and C3 which form an interface between the ATM network and the final users U1, U2, U3 and U4 and perform a switching function at the level of the virtual circuits VC. These cross-connects and these switching devices are interconnected in this example by physical optical fiber buses transporting SDH frames (Synchronous Digital Hierarchy); this rate hierarchy has been defined by CCITT) which comprise various virtual paths VP. Each final user is identified by a virtual path/circuit pair (VP, VC) and the address information used for routing the cells in the network comprises two fields: a virtual path identifier VPI and a virtual circuit identifier VCI.

The ATM switching technique consists of segmenting the traffic into cells of 53 octets of which 48 octets are used for the message and 5 octets are used for the header. At the level of the switching devices, the information streams coming from the various users are divided into cells which are time multiplexed on virtual paths. Empty cells are regularly inserted between the data cells transported by the various virtual paths to obtain a total rate that is equal to the rate of an SDH bus, that is to say, 155 Mbit/s.

According to Recommendation 1610 of CCITT, specific cells called OAM cells of the type F4 are inserted pseudo-periodically into the data cell stream to monitor the quality of the virtual paths (VP).

These cells are identified by a virtual circuit identifier VCI assigned beforehand. The insertion of these cells is pseudo-periodic in so far as, in conformity with Recommendation 1610, the requests for inserting an OAM cell are periodically launched after each series of N/2 cells (N may assume the value 128, 256, 512 or 1024), the OAM cell being inserted in the place of the first empty cell after such a request.

The OAM cells of the type F4 for managing the quality of the virtual paths more specifically comprise the following two fields which will be used in the rest of the description:

a field TUC coded in 16 bits, which indicates the total number of user cells transmitted before the insertion of the OAM cell, modulo-65536.

an error detection code of the type CRC, calculated for all the information fields of the data cells transmitted between this OAM cell and the previous cell.

Identical monitoring cells called OAM cells of the type F5 are provided by Recommendation 1610 of CCITT at the level of the virtual circuits. They are identified by a value assigned beforehand of a field PT in the header of the ATM cells. Thus, in its application to secure virtual paths VP the invention which is described is directly applicable to securing at the level of virtual circuits VC.

In the embodiment which will now be described, the security of the network is ensured by duplicating certain virtual paths VP. Therefore, all the data cells of a virtual path called main path and identified by an identifier VPI1 are copied in another virtual path called substitute path and identified by an identifier VPI2. Only the VPI fields and the check codes of the headers of the cells are different. And only the OAM cells which are inserted into the virtual paths in a pseudo-periodic manner may have different places in the main path and in the substitute path.

For this security to be effective, the main path and the substitute path are to take different routes. The transit times of the network thus differ for the two paths. The shift between a main path and a substitute path in number of cells is to be known at any instant, so that it is possible to switch from one path to the other without a loss or duplication of cells.

The shift is to be known the moment the virtual path is opened even before it has received OAM monitoring cells. Therefore, the invention consists of implementing a first method described with reference to FIG. 2.

Figure 2:
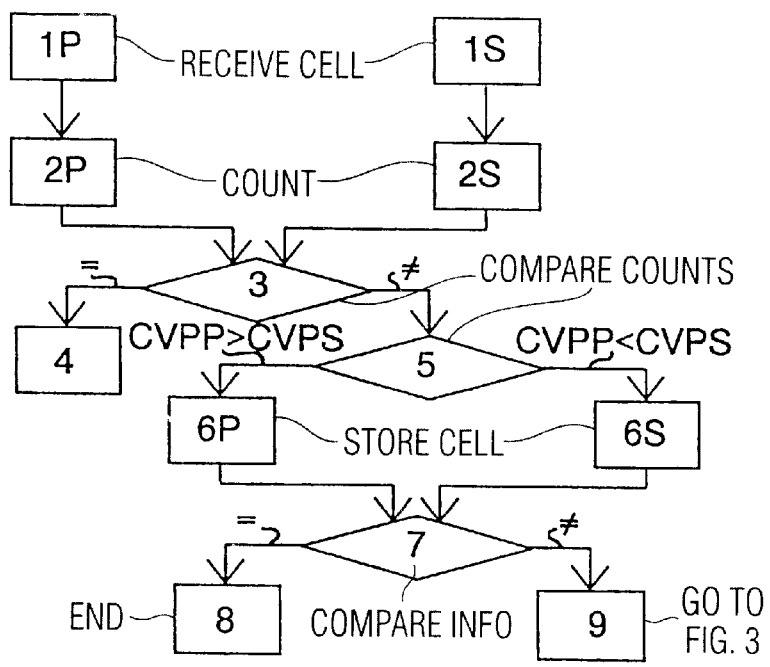
FIG. 2 is an operation flow chart of a first search method for searching the shift between a main path and a substitute path.
Figure 3:
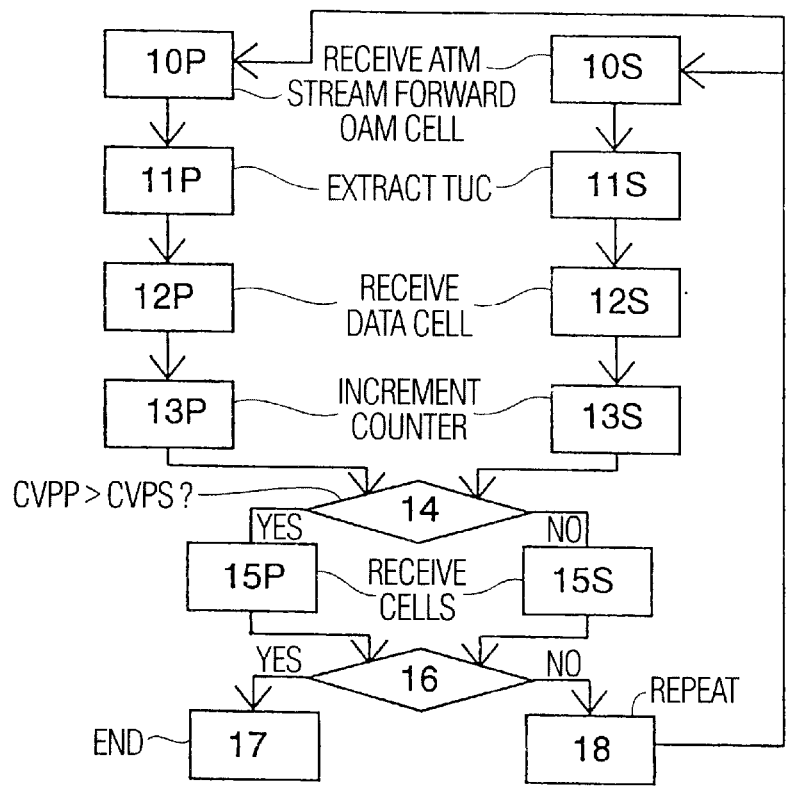
FIG. 3 is an operation flow chart of a second search method for searching the shift between a main path and a substitute path.

According to FIG. 2 the various steps of this first method are the following:

box 1P: waiting for the reception of an ATM data cell on the main virtual path. The moment such a cell is received, the method proceeds to box 2P.

box 1S: waiting for the reception of an ATM data cell on the substitute virtual path. The moment such a cell is received, the method proceeds to box 2S.

box 2P: a counter CVPP indicating the number of cells received on the main path VPP is incremented. Then the operation proceeds to box 3.

box 2S: a counter CVPS indicating the number of cells received on the substitute path VPS is incremented. Then the operation proceeds to box 3.

box 3: the information fields of the cells received on the main path and on the substitute path respectively, are compared. If they are identical, the operation is terminated at box 4. If not, it proceeds to box 5.

box 4: end of the first method. The shift between the main path and the substitute path is known (in this case it is zero).

box 5: the two counters CVPP and CVPS are compared. If CVPP>CVPS, the operation proceeds to box 6P. If not, it proceeds to 6S.

box 6P: after (CVPP−CVPS) cells have passed on the substitute path, the first cell arriving by this path is stored. Similarly, the first cell arriving by the main path is also stored. Then the operation proceeds to box 7.

box 6S: after (CVPS−CVPP) cells have passed on the main path, the first cell arriving by this path is stored. Similarly, the first cell arriving by the substitute path is also stored. Then the operation proceeds to box 7.

box 7: the information fields of the stored cells in box 6P or 6S are compared. If they are identical, the operation is terminated at box 8. If not, the operation proceeds to box 9.

box 8: end of this first method. The shift between the main path and the substitute path is known. It is equal to the difference between the two counters CVPP and CVPS. To each cell of the main path thus corresponds, taking account of this shift, a cell of the substitute path called counterpart cell.

box 9: it has not been possible to evaluate the shift between the two paths by applying this first method. A second method described with reference to FIG. 3 is implemented in that case.

In a first advantageous variant of the invention, various cells are obtained in boxes 1P and 1S, on the one hand, and in boxes 6P and 6S, on the other, and the comparisons of the boxes 6 and 7 relate to these various cells to detect the correspondence between cells of the main path and of the substitute path despite any bit error in an information field.

In another variant, the comparisons made in boxes 3 and 7 do not relate to the two information fields of the cells being identical, but a maximum likelihood criterion is used which permits of correspondence between cells, therefore the number of bits which differ in one or more cells remains below a given threshold.

The second method described with reference to FIG. 3 uses the information signals contained in the OAM cells inserted by the transmitting switching device in the wanted data stream. It is thus more effective than the first method, because it is based on the number of cells transmitted by the source and no longer on the number of cells received at the point of destination. However, the method cannot be used when starting, because, an OAM cell must first have been received before the method can be used.

According to FIG. 3, the various steps of the second method are the following:

box 10P: the ATM stream supporting the main path is received. The processes of the OAM cells of the type F4 of this stream are supposed to be carried out and only these OAM cells that have a correct CRC field and a TUC field that is compatible with the number of received data cells are retained. The moment such a cell arrives, the operation proceeds to box 11P.

box 10S: similarly, the moment a correct OAM cell is received on the substitute path, the operation proceeds to box 11S.

box 11P: the TUC field is extracted from the OAM cell and the counter CVPP is initialized with the value of this TUC field (at the start there is supposed that the difference between the main path and the substitute path is less than 65536 cells). Then the operation proceeds to box 12P.

box 11S: the TUC field is extracted from the OAM cell and the counter CVPS is initialized with the value of this TUC field. Then the operation proceeds to box 12S.

box 12P: the arrival of a data cell by the main path is waited for. The moment such a cell is received, the method proceeds to box 13P.

box 12S: the arrival of a data cell on the substitute path is waited for. The moment such a cell is received, the method proceeds to box 13S.

box 13P: the counter CVPP is incremented and the operation proceeds to box 14.

box 13S: the counter CVPS is incremented and the operation proceeds to box 14.

box 14: the counters CVPP and CVPS which have just been initialized with the values of the TUC fields contained in the OAM cells received, respectively, on the main path and on the substitute path are compared. If CVPP>CVPS, the operation proceeds to box 15P. If not, it proceeds to box 15S.

box 15P: a cell is obtained on the faster path, that is to say, the main path in this case, and its counterpart presenting itself on the substitute path which is the less fast path, is obtained after (CVPP−CVPS) cells have passed. The operation then proceeds to box 16.

box 15S: a cell is obtained on the faster path, that is to say, the substitute path in this case, and its counterpart presenting itself on the main path which is the less fast path is obtained after (CVPS−CVPP) cells have passed. The operation then proceeds to box 16.

box 16: the information fields of these cells are compared. If they are the same, the operation is terminated at box 17. If not, the operation proceeds to box 18.

box 17: end of this second method. The shift between the main path and the substitute path is known. It is equal to CVPP−CVPS.

box 18: the method is repeated with new OAM cells being obtained on the main path and on the substitute path, respectively. But the counters CVPP and CVPS are first shifted relative to each other by 65536 cells.

Similarly to the first method, a variant of this second method consists of obtaining various cells in boxes 15P and 15S, and making the comparison of the box 16 with these various cells in order to detect the correspondence between cells of the main path and of the substitute path despite any error at bit level in an information field. In another variant, this comparison does not relate to a correspondence between the two information fields of the cells, but it uses a maximum likelihood criterion to either or not permit the correspondence between two cells.

Once the values of the initialized cell counters CVPP and CVPS and the shift are known, it is still necessary to verify this shift periodically by checking whether there is equality between the information field of the cell received by the main path and its counterpart received by the substitute path after a shift. On the other hand, the second method is restarted to determine the new shift and reinitialize the counters CVPP and CVPS.

In an advantageous embodiment this check consists not only of comparing the received cell with its counterpart, but also with several cells that precede and several cells that follow in order to detect the sought shift despite a loss or an erroneous insertion of several cells which makes it possible to avoid the second shift search method being started unavailingly. For example, the received cell is compared with the two cells that precede and the two cells that follow.

The shift between the main path and its substitute path is thus available at any instant, so that it is possible to avoid the loss or the duplication of cells during the witching operation from the main path to the substitute path.

Figure 4:
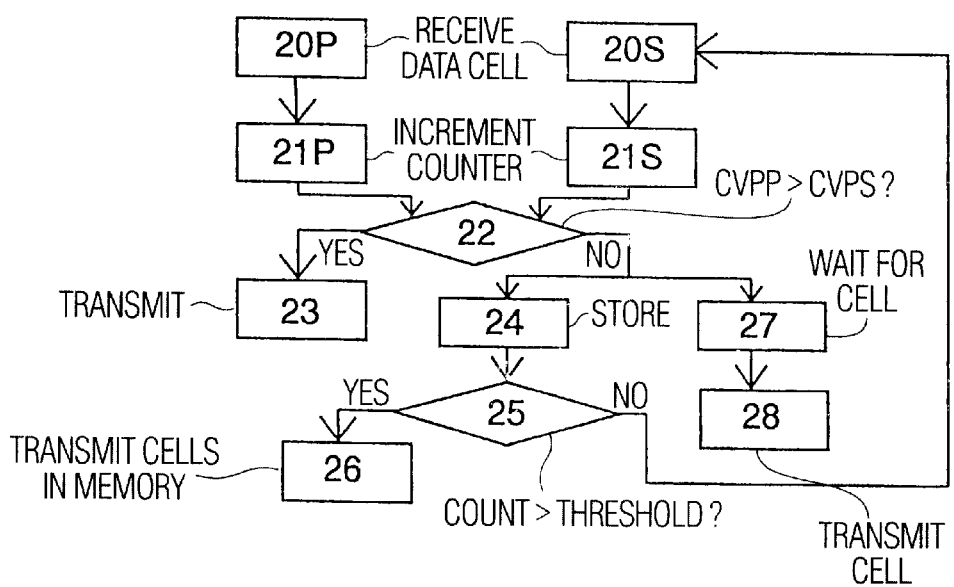
FIG. 4 is an operation flow chart of a switching method for switching from one path to the next, FIG. 5 gives a survey in the form of function blocks of all the functions used in the invention.

The invention also relates to the criteria used for switching from a main path to a substitute path. In a first embodiment of the invention, the path that is to be elected as the main path at a given instant is the faster path. However, it is appropriate to void too frequent switchings which would complicate the management of the network. The witching does not take place until after confirmation of the delay of the main path. This embodiment is utilized by a third method described with reference to FIG. 4. The connotation of the various boxes of this method will be given below:

box 20P: waiting for the reception of an ATM data cell coming from the main path, then box 21P is proceeded to.

box 20S: waiting for the reception of an ATM data cell coming from the substitute path, then box 21S is proceeded to.

box 21P: incrementation of the counter CVPP and box 22 is proceeded to.

box 21S: incrementation of the counter CVPS and box 22 is proceeded to.

box 22: comparison of the counters CVPS and CVPP. If (CVPP>CVPS), the operation proceeds to box 23. If not, both box 24 and 27 are proceeded to.

box 23: the cell that has been received on the main path in box 20P is transmitted to the final user.

box 24: the cell received on the substitute path in box 20S is stored at the end of a memory called circulating memory, and the operation proceeds to box 25. This memory is, for example, an indirect address memory having a capacity of 60 cells of which the source is safeguarded.

box 25: the number of cells stored in the circulating memory are compared with a given threshold. Beyond this threshold, the operation proceeds to box 26. On this side of the threshold the operation is resumed at box 20S.

box 26: the delay of the main path is confirmed and the substitute path is switched to which becomes the main path. Therefore, the cells initially contained in the circulating memory are first transmitted to the final user. Then the switching as such is effected.

box 27: waiting for the reception of an ATM data cell on the main path. The moment such a cell is received, the operation proceeds to box 28.

box 28: the counter CVPP is incremented; the cell that has just been received is transmitted to the final user. And the initial value of the circulating memory is shifted to delete this received cell from the circulating memory.

To avoid a loss of cells during the switching operation from a slower to a faster path, this embodiment thus consists of utilizing said circulating memory for storing the cells received in advance on the faster path and handling the cells contained in this memory before switching them. The introduction of a filling threshold of this memory beyond which the switching is not effected makes it possible to avoid too frequent switchings from one path to another.

According to an advantageous variant of this embodiment, an additional memory of the FIFO type (First- In, First-Out) is provided to absorb the shift between the main path and the substitute path when this shift comprises more than the size of the circulating memory. Such a situation occurs only in the case where the shift search method has been started after a loss of shift between the two paths, and where the shift obtained by this method has appeared to be more than the capacity of the circulating memory. In that case, the cells arriving by the substitute path are stored in the additional memory and the value of the counter CVPS that corresponds to the first stored cell is recorded. When the counter CVPP reaches this value, first the contents of the additional memory are handled after which a switching is made from the main path to the substitute path. This additional memory is thus only used in this described case. In normal operation it is the circulating memory described above that is used.

In another embodiment a second subsidiary criterion is used for the switching: the quality of the main path relative to that of the substitute path. The switching from the main path to the substitute path only takes place if the latter has at least the same quality as the main path. The estimation of this quality is made in that the error detection field of the OAM cells as well as that of the received data cells are examined. In the case where the shift between the two paths is lost, while a switching is to take place based on the criterion of rapidity, the latter known shift is used for carrying out this switching. On the other hand, if a switching is to take place based on the criterion of quality, the switching is not made.

In another embodiment of the invention the user of the final service has the possibility of choosing other switching criteria, for example, he may impose a switching based on the single criterion of quality or on a criterion derived from information supplied by the adaptation layer AAL of the ATM network which is located at the level of the user application.

In the case where these criteria contribute to effecting a switching from the faster path to the slower path, the |CVPP−CVPS| first cells arriving at the new main path are not transmitted to the final user to avoid any duplication in respect of the reception of the cells.

Figure 5:
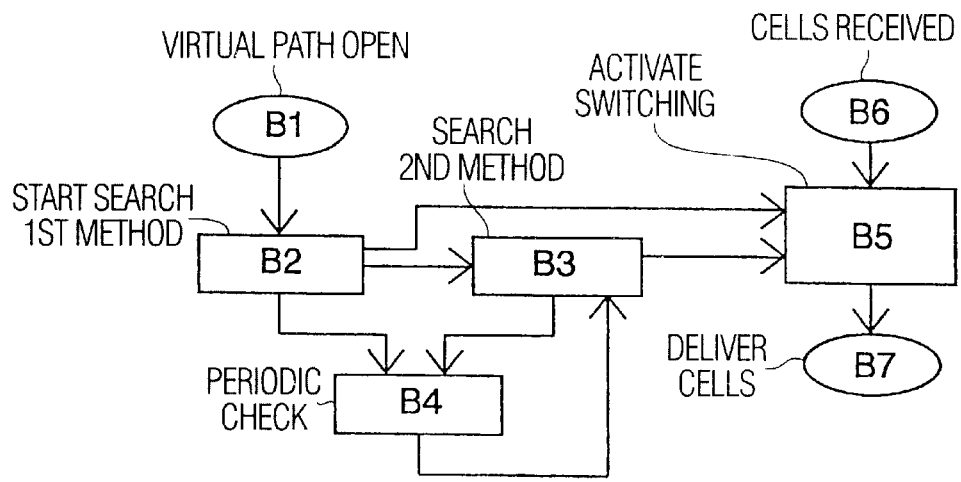

FIG. 5 gives a survey in the form of function blocks of all the functions used in the invention.

According to FIG. 5, when a virtual path copied from a substitute path is open (block B1), the first method of searching for a shift between the main path and the substitute path is activated (block B2). If the shift is not found, the second shift search method is activated (block B3). Once the shift is known, a periodic check function is activated (block B4). And if the shift is lost, the second shift search method is implemented. The counters CVPP and CVPS initialized by the first and second methods are used by the switching method (block B5) which is activated when ATM data cells are received on the main path and on the substitute path (block B6). Finally, the cells are delivered on either path (block B7) after they have been processed by the switching method.

Figure 6:
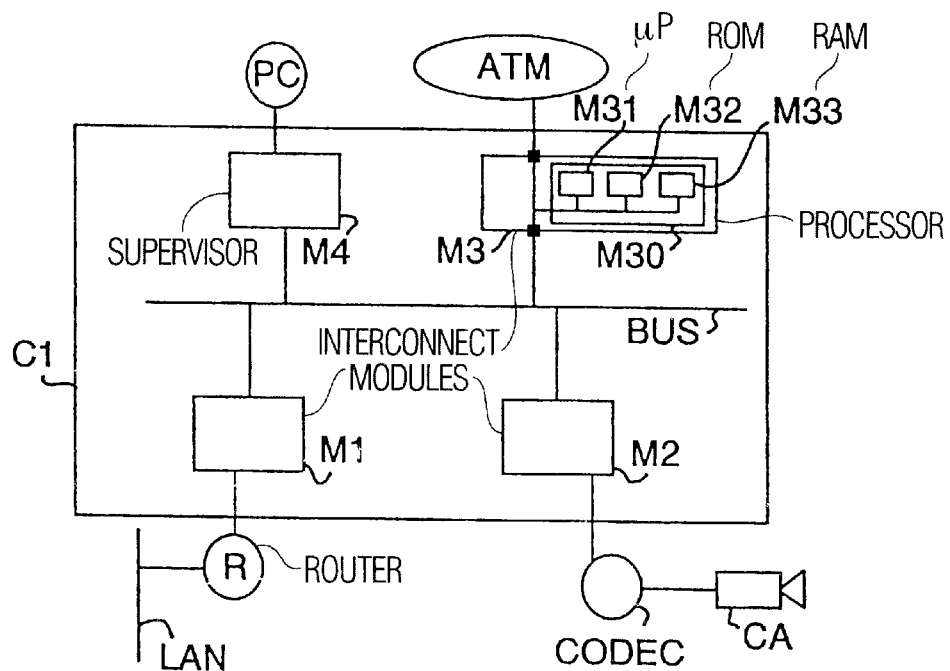
FIG. 6 represents a switching device according to the invention.

FIG. 6 shows in a diagram an ATM switching device according to the invention.

According to FIG. 6 such a switching device comprises, on the one hand, interconnection modules M1 and M2 for interconnection to user services U1 and U2 and, on the other hand, an interconnection module M3 for interconnection to the ATM network. It also comprises a module M4 for supervising all said modules. This supervision module is connected to an external computer PC which manages the switching device. These modules are interconnected by at least one data bus BUS. The service U1 is, for example, a local area network interconnection service. The module M1 is thus connected to a router R, which itself is connected to a local area network LAN. The service U2 is, for example, a video conferencing service and the module M2 is thus connected to a CODEC (COder/DECoder) itself connected to a camera CA. These various modules are manufactured based on a processor block M30 (for example, an M68040 by Motorola which comprises an actual microprocessor M31, a ROM M32 and a RAM M33).

The invention is thus implemented in software form in the interconnection module M3 for interconnection to the ATM network. To obtain higher rates, however, it is necessary for implementing the invention to utilize specific circuits which may easily be developed by a person of ordinary skill in the art on the basis of flow charts described previously, while utilizing the VHDL language, for example.

Other details relating to said switching device and an ATM network in which it is intended to be used, may be found in the article entitled "Brehat: first high-bit rate network based on ATM technology" by J. Legras, G. Onno and M. Lemonier, published in "Commutation & Transmission", no. 3, 1991.

Although the invention has been described in its application to ATM networks for securing virtual paths whose quality is monitored, it is applicable to securing at the virtual path level, or to connections whose quality is not monitored. In the latter case one does not have the disposal of information supplied by the OAM cells, and only one type of the first shift search method can be used, which is not very reliable. Such an arrangement, however, makes it possible to limit the risks of cell loss or cell duplication during the switching operations. Finally, the invention may also be applied with the same restrictions to any packet switching network in which the order of the packets is not modified.

What is claimed is:

1. A packet switching telecommunications network comprising:

a plurality of switching nodes between which data packets are transported by logic paths, one of said logic paths being a main path between a first switching node and a second switching node, and means for linking at least a substitute logic path to said main path for transporting the same data packets between said first switching node and said second switching node as data packets transported by said main path, wherein said second node comprises switching means for switching from the main path to the substitute path, characterized in that the second node further comprises:

means for determining an instant of time for switching from the main path to the substitute path, and means for preventing loss or duplication of packets at the time of switching independent of the respective numbers of data packets received over the main path and the substitute path while the switching means has been switched to the main path.

2. A network as claimed in claim 1, characterized in that said logic paths are virtual paths.

3. A network as claimed in claim 1, characterized in that said means for preventing comprises:

counters for counting data packets received on said logic paths, comparing means for comparing data packets received on said main path and on said substitute path, and confirmation means responsive to said comparing means for confirming a shift in time between receipt of said data packets on the basis of the difference between said counters when the data packets are identical.

4. A network as claimed in claim 3, characterized in that the network inserts, between the data packets, operation and maintenance (OAM) cells containing respective TUC fields indicating a number of data packets transmitted before insertion of the OAM cell, and said counters are initialized with the value of the TUC field of the respective received OAM cells.

5. A network as claimed in claim 2, characterized in that said means for preventing comprises:

means for comparing an information field of a data packet received over the main path with an information field of a data packet received over the substitute data path to determine if the compared data packets are corresponding data packets, means for storing a number equal to the difference in respective numbers of data packets received over the main and substitute paths since the last substantially simultaneous receipt of corresponding packets to determine a shift between the main and substitute paths, and means for storing a plurality of data packets most recently received over the substitute path, and when the main path has been the faster path prior to the instant of switching, switching the substitute path to become the new main path at said instant of switching, discarding data packets received subsequently over the new main path until the number of discarded data packets equals the stored number, and then transmitting the data packets received over the new main path, when the substitute path is the faster path, and subsequent to the instant of switching the substitute path becomes the new main path, stopping transmission of data packets from the main path at said instant of time, then transmitting a number of stored data packets most recently received over the substitute path equal to the stored number, and then sequentially transmitting data packets received over the new main path path subsequent to said instant of switching.

6. A switching node as claimed in claim 5, characterized in that said means for preventing further comprises periodic check means for periodically checking that the content of a data packet received over the faster path corresponds to the content of a data packet received over the slower path after a shift equal to said stored number.

7. A switching node for use in a packet switching telecommunications network having a plurality of said switching.nodes between which data packets are transported by logic paths, one of said logic paths being a main path between a given node and said switching node, and means for linking at least a substitute logic path to said main path for transporting the same data packets to said switching node as data packets transported by said main path, wherein said switching node comprises switching means for switching from the main path to the substitute path, characterized in that said switching node further comprises:

means for determining an instant of time for switching from the main path to the substitute path, and means for preventing loss or duplication of packets at the time of switching independent of the respective numbers of packets received over the main path and the substitute path while the switching means has been switched to the main path.

8. A switching node as claimed in claim 7, characterized in that said logic paths are virtual paths.

9. A switching node as claimed in claim 7, wherein said switching means is activated in response to malfunctioning of said main path, characterized in that said means for determining an instant of time comprises malfunction detection means responsive to a quality criterion of the logic paths.

10. A switching node as claimed in claim 9, characterized in that the network transmits operation and maintenance (OAM) cells containing error detection fields, and said data packets contain respective information fields, said malfunction detection means examines the received data packets and the OAM cells, and said instant of time is determined at least in part in response to determination of quality of path transmission, and a shift to the substitute path is made only if the path transmission quality of the substitute path is at least the same as the quality of the main path.

11. A switching node as claimed in claim 7, characterized in that said means for preventing comprises:

means for comparing an information field of a data packet received over the main path with an information field of a data packet received over the substitute data path to determine if the compared data packets are corresponding data packets, means for storing a number equal to the difference in respective numbers of data packets received over the main and substitute paths since the last substantially simultaneous receipt of corresponding packets to determine a shift between the main and substitute paths, and means for storing a plurality of data packets most recently received over the substitute path, and when the main path has been the faster path prior to the instant of switching, switching the substitute path to become the new main path at said instant of switching, discarding data packets received subsequently over the new main path until the number of discarded data packets equals the stored number, and then transmitting the data packets received over the new main path, when the substitute path is the faster path, and subsequent to the instant of switching the substitute path becomes the new main path, stopping transmission of data packets from the main path at said instant of time, then transmitting a number of data packets most recently received over the substitute path equal to the stored number, and then sequentially transmitting data packets received over the new main path path subsequent to said instant of switching.

12. A switching node as claimed in claim 11, characterized in that said means for preventing further comprises periodic check means for periodically checking that the content of a data packet received over the faster path corresponds to the content of a data packet received over the slower path after a shift equal to said stored number.

13. A switching node as claimed in claim 11, further comprising means for verifying whether packets received over the main and substitute paths correspond after determination of said shift, wherein said means for verifying compares respective information fields of data packets received.over one of said paths with respective information fields of at least two data packets preceding and two data packets following a data packet delayed by said shift.

14. A switching node as claimed in claim 7, characterized in that said means for preventing comprises:

a circulating memory for storing packets received previously on the substitute path, means for deleting packets from said circulating memory when corresponding packets are received on the main path, and means for transmitting the packets stored in the circulating memory at an output of said node after the switching instant, when the main path has been a faster path than the substitute path.

15. A switching node as claimed in claim 14, characterized in that said instant of time is determined in response to a filling threshold of said circulating memory.

16. A switching node as claimed in claim 14, characterized in that said means for preventing further comprises:

an additional memory, responsive to a shift between corresponding packets received over said main path and substitute path being larger than the size of said circulating memory, for storing packets received beforehand on said substitute path, and means for handling the contents of said additional memory before switching paths when said corresponding packets are subsequently received on said main path.

17. A switching node as claimed in claim 7, characterized in that said means for preventing comprises:

counters for counting packets received on said logic paths, comparing means for comparing packets of a same rank received on said main path and on said substitute path, and confirmation means for confirming a shift in time between said packets of a same rank on the basis of the difference between said counters when the packets of said same rank are identical.

18. A switching node as claimed in claim 17, characterized in that the network inserts, between the data packets, operation and maintenance (OAM) cells containing respective TUC fields indicating a number of data packets transmitted before insertion of the OAM cell, and said counters are initialized with the value of the TUC field of the respective received OAM cells.

19. A switching node as claimed in claim 17, characterized in that said means for determining an instant of time comprises malfunction detection means responsive to transmission speed of said the logic paths, malfunctioning of a path being detected only when its delay is confirmed.

20. A switching node as claimed in claim 19, characterized in that the network transmits operation and maintenance (OAM) cells containing error detection fields, and said data packets contain respective information fields, said malfunction detection means examines the received data packets and the OAM cells, and said instant of time is determined at least in part in response to determination of quality of path transmission, and a shift to the substitute path is made only if the path transmission quality of the substitute path is at least the same as the quality of the main path.

\* \* \* \* \*